Aug. 11, 1936.   F. A. RANDALL ET AL   2,050,586
AUTOMATIC WEIGHING MACHINE
Filed Feb. 6, 1934    7 Sheets-Sheet 4
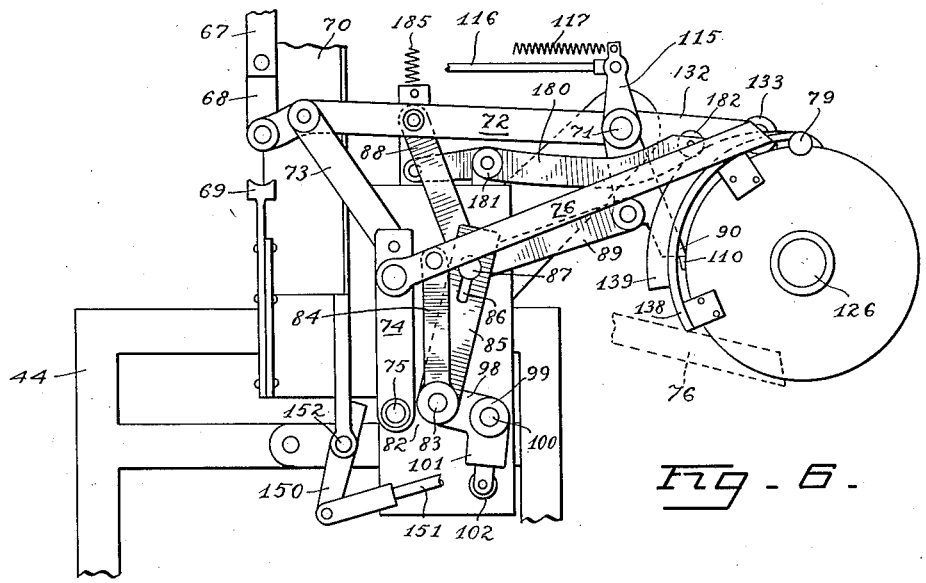
Fig-6-
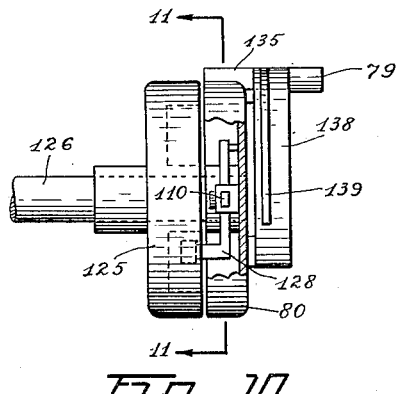
Fig-10-
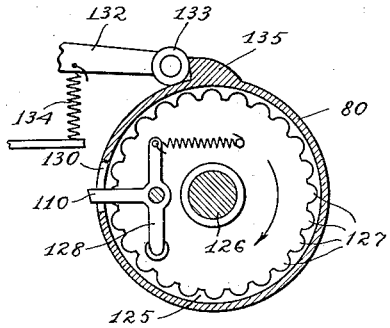
Fig-11-
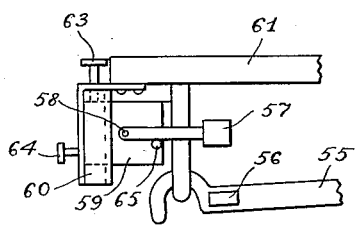
Fig-16-
INVENTORS
FRANK A RANDALL
JOHN D. CANTONI
BY Jas. M. Naylor
ATTORNEY

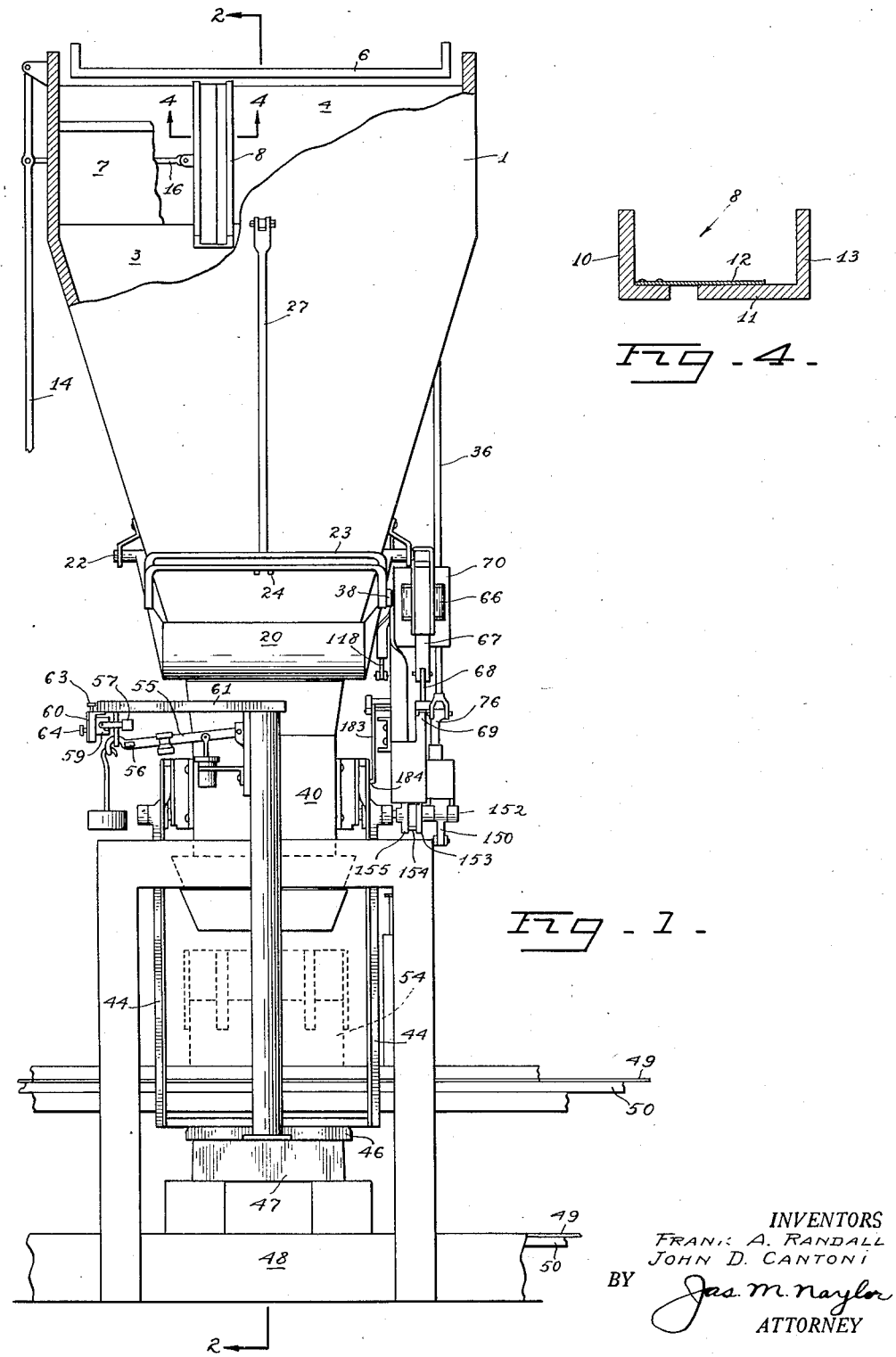

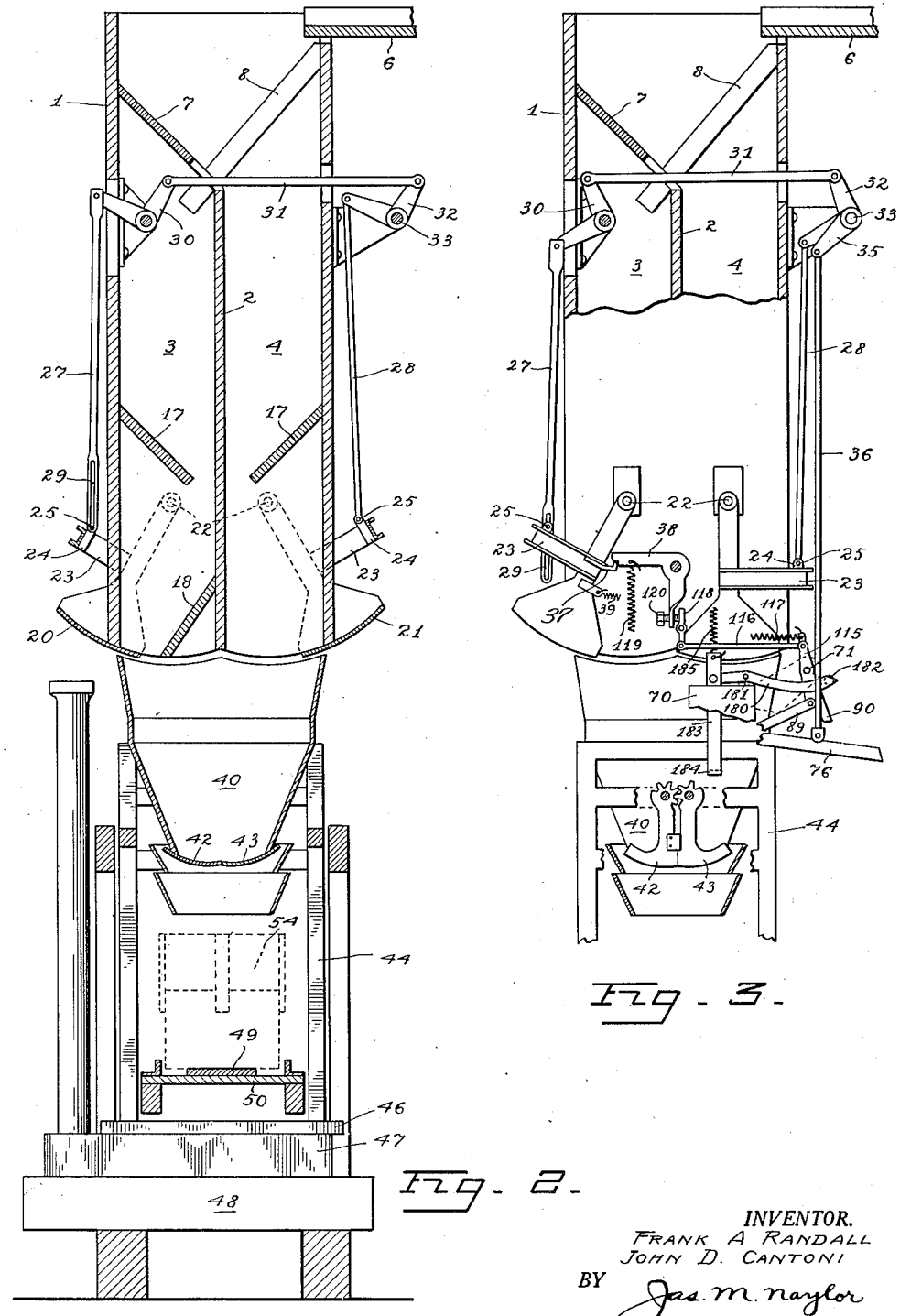

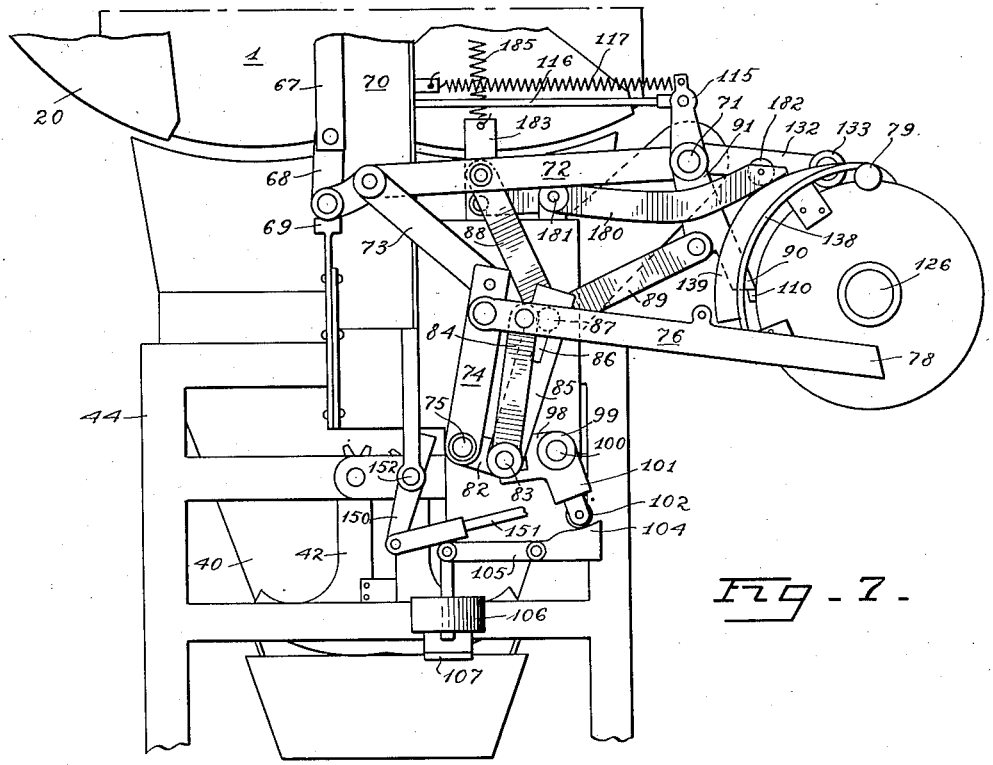
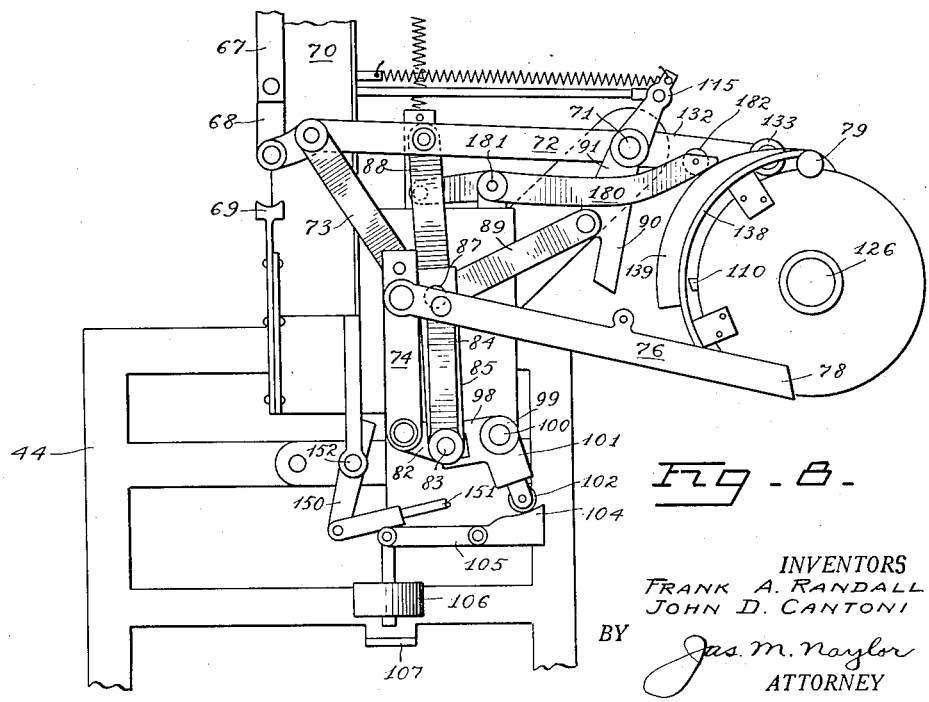

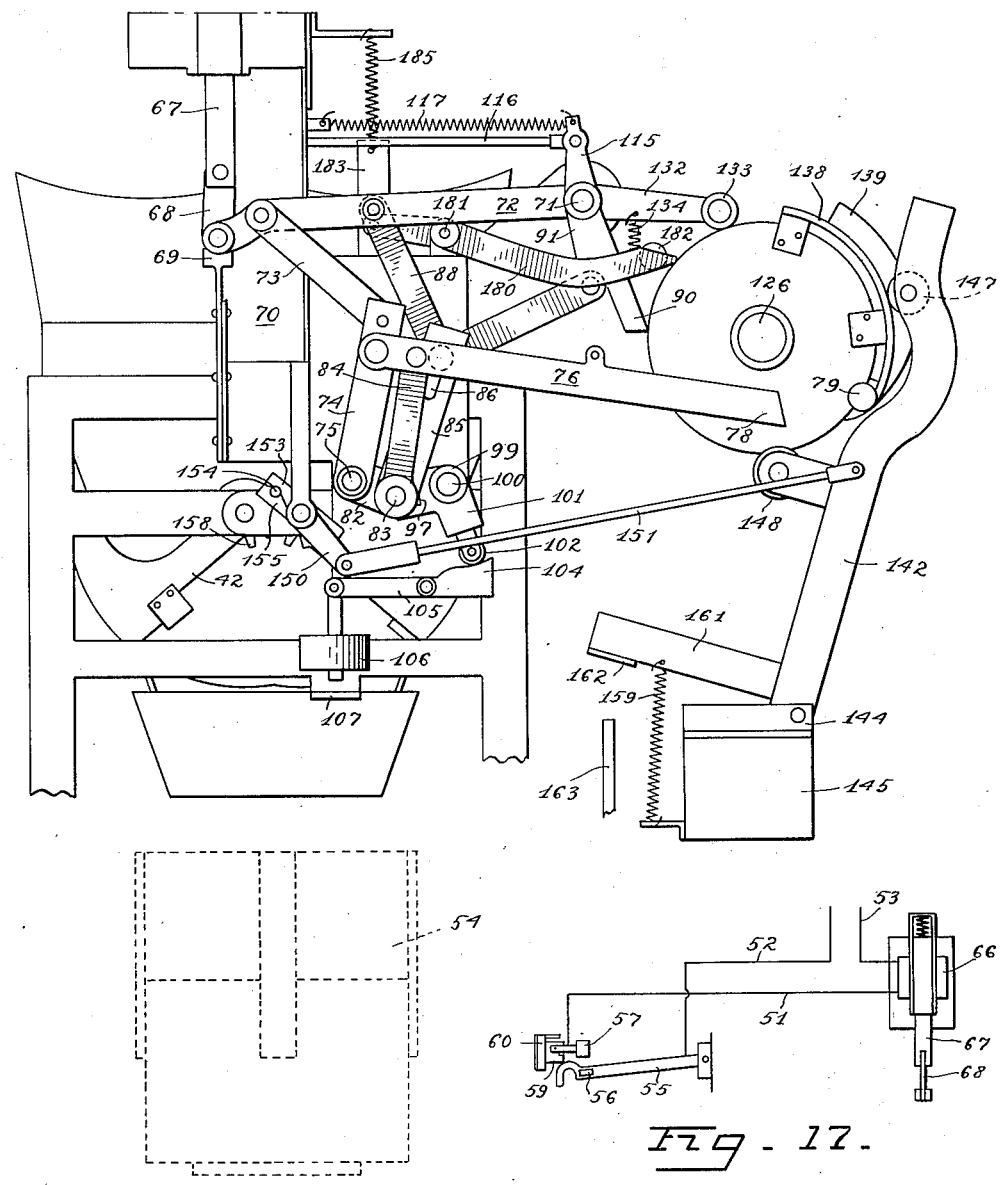

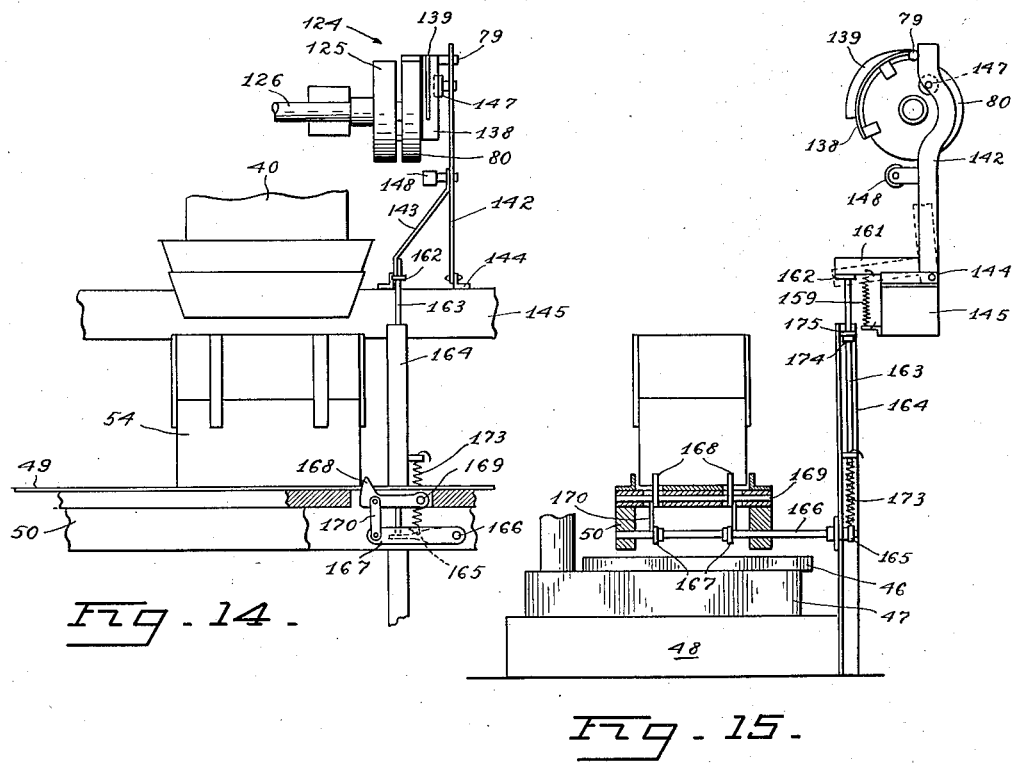
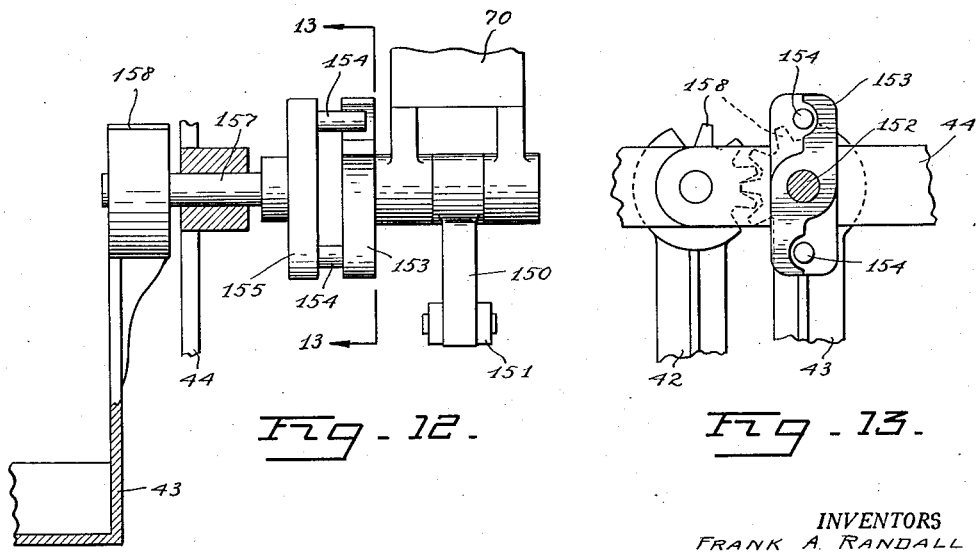

Patented Aug. 11, 1936

2,050,586

UNITED STATES PATENT OFFICE 2,050,586

AUTOMATIC WEIGHING MACHINE

Frank A. Randall and John D. Cantoni, Napa, Calif.

Application February 6, 1934, Serial No. 709,967

10 Claims. (Cl. 249—59)

Our invention relates to improvements in automatic weighing machines. More particularly it relates to the type of weighing machine especially adapted to weigh pourable substances.

The object of our invention is to provide a fully automatic weighing machine adapted to operate with accuracy and at great speed.

Another object of our invention is the provision of a main feed for delivery of the bulk of the material onto the weighing machine in less quantities than the exact weight desired, and an adjustable trickle feed for delivery of comparatively small amounts of material up to the exact weight.

Another object of our invention is to provide means for successive closing of the main and trickle feed, and for the discharge of weighed material from the weighing machine into a container.

Another object of our invention is to provide means for placing the containers in position to receive the charge of weighed material and for subsequent removal of the filled containers.

Another object of our invention is to provide an auxiliary weight which rests on the scale while the main bulk of material is being delivered onto the weighing machine from the main feed, and means for lifting said weight from the scale thereafter.

Other objects and advantages of the invention will appear as the specification proceeds, and the novel features thereof will be particularly pointed out in the appended claims.

In general terms, the apparatus of our invention consists of a main feed and a trickle feed arranged in connection therewith, into which material is fed at a substantially uniform rate. Both feeds lead to a weighing receiver attached to a standard scale in spaced relation thereto. An endless belt runs therebetween and conveys the containers which are positioned and held under said receiver by mechanism provided for that purpose.

An auxiliary weight rests on the scale while the receiver is charged up to a predetermined weight, whereupon the tilting of the scale beam closes the electric circuit and thereby instantly closes the main feed and lifts the auxiliary weight off the scale, whereupon the scale beam drops. The trickle feed delivers the amount of material necessary to make up the exact weight desired whereupon the scale beam is raised for a second time, and the electric circuit is again established. The mechanism controlled by said circuit successively closes the trickle feed, discharges the weighed material from the receiver into the container, and returns the mechanism into the starting position in preparation for the next weighing operation.

Description of drawings

Reference will now be made to the drawings for a more detailed description of the invention.

Figure 1 is a front elevation of the apparatus of our invention, part of the hopper being broken away in order to disclose the arrangement of parts within the same.

Figure 2 is a vertical cross-section of the apparatus taken along the line 2—2 of the Figure 1.

Figure 3 is a side elevational view of the hopper showing the arrangement of certain parts of the mechanism employed for this operation thereof.

Figure 4 is a section of the chute taken along the line 4—4 of the Figure 1.

Figures 6—9, inclusive, show the relation of the parts of the operating mechanism in different stages of a weighing operation.

Figure 10 is a front view of the clutch mechanism, partially broken away to disclose the arrangement of inner parts thereof.

Figure 11 is a section of the clutch taken along the line 11—11 of Figure 10.

Figure 12 is a detail of the gate operating mechanism.

Figure 13 is a section of said mechanism taken along the line 13—13 of Figure 12.

Figure 14 is a front elevational view of a container arresting mechanism.

Figure 15 is a side view of the mechanism shown in Figure 14.

Figure 16 is a detail of an electric contact, and

Figure 17 is a wiring diagram showing the circuit employed in operation of our device.

Detailed description of invention

Figure 5:
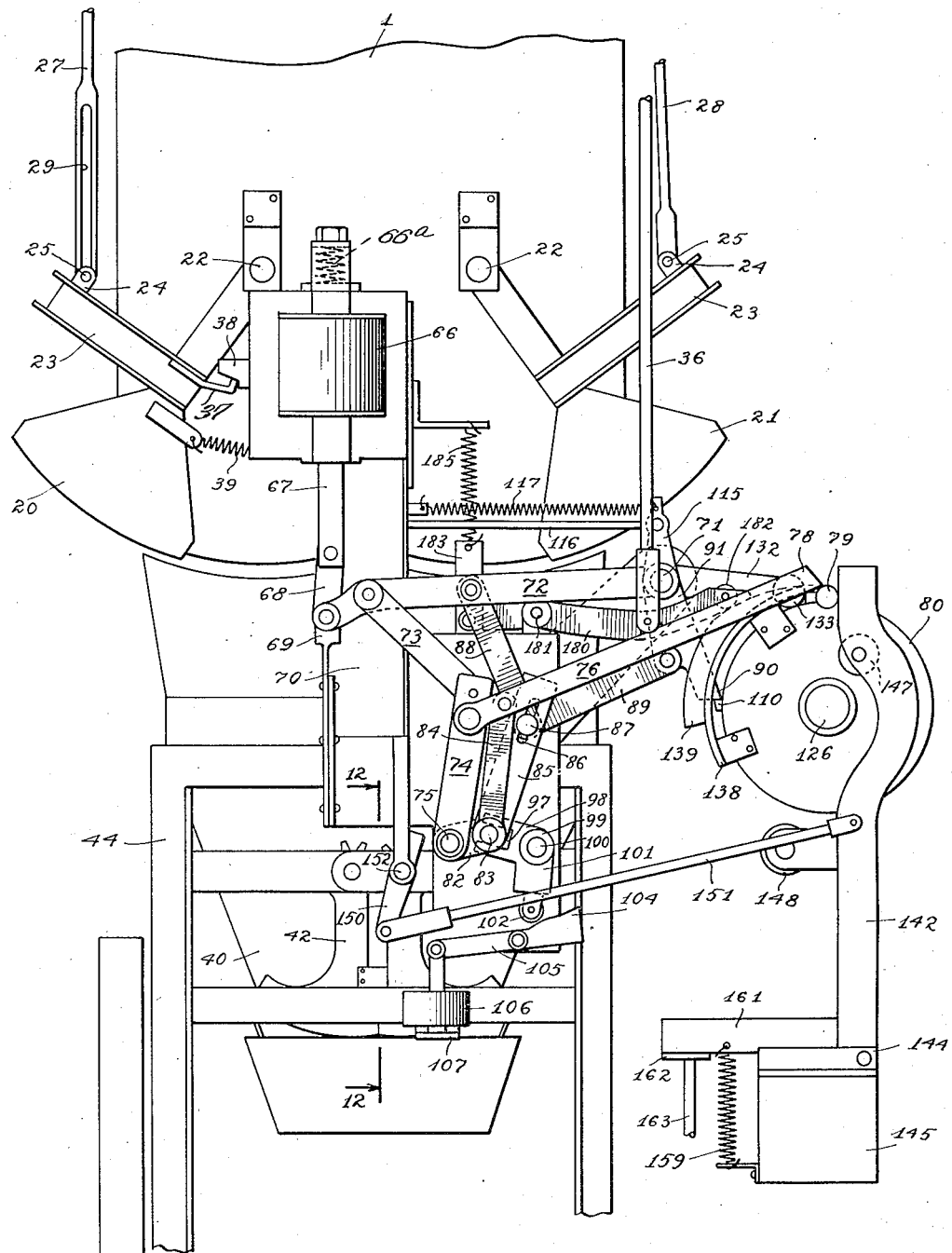
Figure 5 is a side view of the operating mechanism of our apparatus.

The apparatus of our invention includes a stationary hopper supported by a frame (not shown) and divided by a vertical partition 2 into a trickle feed, compartments 3 and a main feed compartment 4.

Material such as dried fruit or the like, or any other pourable substance, is delivered into the hopper 1 at a substantially uniform rate by a shaker 6. Part of said material drops directly into the main feed compartment 4 while the part which is thrown farther from the shaker 6 is deflected into said feed by a deflecting partition 7 covering the trickle feed 3. A comparatively small portion of material is allowed to pass into the trickle feed 3 by means of a small chute 8 leading from the shaker 6 into said feed.

As shown in Figure 4, the chute 8 comprises a side wall 10 with a portion of a bottom 11 of the chute and a metal strip or auxiliary bottom piece 12 attached thereto, and a side wall 13 with another portion of the bottom 11. The latter is affixed to the wall of the hopper 1 and to the partition 2 while the side 10 is movable with respect thereto by means of a lever 14 and a link 16. By means of this arrangement the width of the chute 8 is adjustable and the amount of material to be delivered by the trickle feed may be conveniently and effectively regulated.

Baffle boards 17 are arranged in the path of falling material inside of the feeds 3 and 4 to break the force of the falling material. An inclined bottom 18 restricts the discharge area of the trickle feed 3.

At the discharge ends of the feeds 3 and 4 arcuate gates 20 and 21, respectively, are swingably mounted for the purpose of instantaneously closing said feeds at predetermined periods. The gates are pivotally attached to the hopper 1 as at 22 and carry outwardly extending channel iron frames 23 which, in turn, have brackets 24 with pins 25 affixed thereto. Links 27 and 28 are pivotally connected to the pins 25, and it will be noted that the link 27 connected to the trickle feed gate 20 has an elongated slot 29 arranged therein in which the pin 25 is adapted to slide. The link 27 is connected to a bell crank 30 and the latter by means of a connecting rod 31 to one end of a bell crank 32, to the other end of which the link 28 is pivotally attached. The bell crank 32 is keyed to a shaft 33 to which a crank 35 is also keyed. The latter, by means of a connecting rod 36, is connected to the operating mechanism which is to be described later.

The downward movement of the connecting rod 36 by means of the crank 35, bell crank 32 and the link 28 closes the gate 21, the weight of the gate itself accelerating the closing. At the same time the pin 25 of the trickle feed gate 20 rides in the slot 29 and the gate remains open, being held in that position by a trigger 38, which engages a stop 37 affixed to the frame 23 of said gate. At the proper moment the trigger 38 is disengaged from the stop 37 by a mechanism to be described later, and a spring 39 constantly closes the gate 20. The upward movement of the connecting rod 36 opens both gates simultaneously.

Material drops from both feeds into a weighing receiver 40 having swingable arcuate gates 42 and 43 carried thereby and adapted to serve as a bottom thereof. The weighing receiver is slightly spaced from the hopper 1 and is supported by a frame 44 which rests on a platform 46 of a standard weighing scale 47. The latter rests on a base 48.

Above the scale 47 and in spaced relation thereto runs an endless belt 49 supported by a support 50. The belt 49 delivers the containers 54 under the weighing receiver, where their movement is arrested by a special mechanism to be later described in detail. The box remains under the receiver until the latter discharges its contents thereinto, and then is allowed to continue its movement.

As shown in Figures 1 and 16, the weighing scale 47 has a conventional beam 55 upon which a contact point 56 is affixed. A cooperating contact point 57 is pivotally attached at 58 to a bracket 59 slidably carried by a slide 60 which in turn is affixed to a stationary scale frame 61. The position of bracket 59 is adjusted by means of a bolt 63 and locked by a bolt 64. The contact point 57 is free to swing about the pivot 58 in upward direction but its downward movement is limited by a stop 65.

The contact points 56 and 57 are electrically connected to a source of electric energy, not shown in the drawings, and to a solenoid 66 (see Figure 17) by wires 51, 52, and 53.

As shown in Figures 5–9 inclusive, the solenoid 66 slidably carries a plunger 67 which terminates with a link 68 the lower end of which rests on a stop 69. The latter is an integral part of an operating mechanism support 70. A spring 66a, arranged on the top of the solenoid 66, yieldably forces the plunger 67 downwardly, whereas the solenoid when being actuated pulls said plunger upwardly. The link 68 is pivotally connected to a main lever 72 which oscillates about a shaft 71, rotatably supported by the member 70. A link 73 operatively connects the main lever 72 and a lever 74 which rocks about a pin 75 carried by said support 70. The lever 74 has a cam lever 76 pivotally attached thereto, to which the connecting rod 36, previously referred to, is fastened.

Figure 5 shows a free end 78 of the cam lever 76 resting on a stud 79 formed in the periphery of a clutch member 80. When the solenoid 66 is actuated it raises the main lever 76 off the stud (as shown in Figure 6). The lever 76 drops down and actuates the gate 21 to closed position, as has been previously described.

A short link 82 is fulcrumed on the pin 75 and carries a stub-shaft 83 on the other end thereof, on which a bar 84 connecting said stub-shaft with the cam lever 76, and a slip arm 85, are journaled. The latter has an elongated slot 86 in the upper end thereof in which a pin 87 slides. The pin 87 serves as a journal to a link 88 connecting with the main lever 72 and a link 89 connecting with a clutch releasing arm 90 of a lever 91 which is journaled on the shaft 71.

The stub-shaft 83 is also adapted to ride in a slot 97 formed in an arm 98 of a bell-crank 99 fulcrumed at 100, the other arm of which carries a roller 102. The latter is designed to ride upon a cam 104 formed on one end of a lever 105, the other end of which pivotally carries an auxiliary weight 106. As shown in Figure 5, the weight 106 rests on a bracket 107, which is affixed to the receiver supporting frame 44.

The main lever 72, being actuated by the plunger 67 when the solenoid 66 is energized, pulls the links 73 and 88 upwardly, whereby the link 73 drops the cam lever 76 down. But the upward movement of the link 88 does not actuate the arm 90, because this movement is neutralized by the slot 86 and the pin 87 sliding freely therein as shown in Figure 6. When the cam lever 76 drops down, the bar 84 forces the stub-shaft 83 downwardly into the position shown in Figure 7, and the pin 87 takes the uppermost position in the slot 86. At the same time the stub-shaft 83 rocks the bell-crank 99 in a counter clockwise direction, causing the roller 102 to ride upon the cam 104 and thereby lift the auxiliary weight 106 off the bracket into a suspended position. The upward and downward movements of the main lever 72 is so rapid, that before the cam lever 76 drops down this lever 72 is restored to its normal position (shown in Figure 5).

Therefore the downward movement of this lever 76 has no effect upon the clutch releasing arm 90.

The parts of the operating mechanism remain in this position until the solenoid 66 is energized a second time. Then the main lever 72 again pulls the links 73 and 88 upwardly. The movement of the link 73 swings the cam lever 75 sidewise and has no practical effect thereon. But the link 88, having the pin 87 in the uppermost position in the slot 76 swings the slip arm 85 in counter clock-wise direction and by means of the link 89 pulls the clutch releasing arm 90 out of engagement with a clutch finger 110, as shown in Figure 8. The auxiliary weight 106 remains in suspended position because the position of the stub-shaft 83 remains the same during this operation.

The lever 91 has an upper arm 115 integral therewith to which a connecting rod 116 and a spring 117 are attached. The spring 117 urges the lever 91 into engagement with the clutch finger 110. The rod 116 is connected with a lever 118 (see Figure 3) which actuates the trigger 38. The latter is adjustable in relation to the lever 118 by means of a bolt 120 and is urged downwardly by a spring 119. The rocking of the lever 91 actuates the rod 116, lever 118 and the trigger 38 thereby instantly closing the trickle feed.

The Figures 10 and 11 show in detail the clutch 124, which we employ in connection with our apparatus. It comprises a clutch drum 125, keyed to a shaft 126 and rotated in the direction shown by an arrow at a constant speed by any suitable motive power (not shown in the drawings). The drum 125 has a series of notches 127 fashioned on the inner side thereof. The driven clutch member 80 freely rotates about the shaft 126 and carries inside thereof a spring pressed pawl 128 having a finger 110 integral therewith, which projects through an opening 130 outside of the member 80 and is engaged by the clutch releasing arm 90. The latter keeps the pawl 128 out of engagement with the notches 127. But at the moment the arm 90 releases the finger 110, the pawl 128 snaps into one of the notches 127, and the member 80 starts to rotate with the clutch drum 125.

The clutch member 80 makes one complete revolution and is disengaged from the drum 125 by the finger 110, striking the arm 90. To prevent a backward rotation of the member 80 and engagement of the pawl 128 with one of the notches 127 while the arm 90 abuts the finger 110, a ratchet 132 carrying a roller 133 is provided. A spring 134 forces the roller 133 to ride upon the surface of the member 80 upon which a stop 135 is affixed. When the member 80 completes its rotation, the arm 90 disengages it from the clutch drum 125, and at the same time the roller 133 snaps into the position shown in Figure 11, thus arresting the backward movement of the member 80.

Besides the stud 79, the member 80 carries a cam 138 and a cam 139 affixed to the latter, the former actuating the receiver gates 42 and 43, and the latter operating a container arresting mechanism and a scale stabilizer.

The receiver gate operating mechanism includes a long arm 142 having a supporting leg 143 both being pivoted to frame members 144 resting on a base 145. The arm 142 carries two rollers 147 and 148 which are so positioned as to be operated by the cams 138 and 139, respectively, and is connected to a crank 150 by means of an adjustable connecting rod 151. As shown in Figures 12 and 13, the crank 150 is keyed to a stub-shaft 152 rotatably carried by the support 70. The stub-shaft 152 terminates with a double arm 153. In spaced relation thereto and normally in alignment with the stub-shaft 152, is a stub-shaft 157 rotatably carried by the receiver frame 44. The latter stub-shaft has a rocker arm 155 keyed thereto on the end facing the double arm 153, the other end thereof being affixed to the receiver gate 43. Integral with the rocker arm 155 are two pins 154 which are adapted to be engaged by the double arm 153 so as not to touch the latter during the weighing operation. The receiver gates 42 and 43 have teeth 158 formed at their pivotal points in mutual engagement and enabling both gates to be opened simultaneously in opposite directions.

The rotation of the clutch member 80 forces the stud 79 against the arm 142 and swings the latter in a clock-wise direction, and by mechanism previously described opens the gates 42 and 43. At this time the roller 147 contacts the cam 138 and rides thereon, thereby keeping the gates open for the time necessary to complete the discharge of material from the receiver 40. A spring 159 returns the arm 142 into its normal position.

The container arresting mechanism shown in Figures 15 and 16 includes a bar 161 affixed to the leg 143 and having a stop plate 162 resting on a push rod 163. The latter is adapted to slide in a support 164 which is fixed to the side of the base 48, and by means of a crank 165 which is operatively connected to a cross shaft 166 rotatably supported by the belt support 50. Arms 167 are affixed to the shaft 166. In spaced relation thereto, dogs 168 are pivoted as at 169 and are connected to said arms by links 170. A spring 173 yieldably urges the dogs 168 upwardly, but their motion is limited by a collar 174 affixed to the push rod 163, and a bracket 175 on the support 164.

When the clutch member 80 is rotated, the cam 139 actuates the roller 148 and forces the arm 142 to swing in a counter clock-wise direction, as shown in dotted lines in Figure 15, and thereby pushes the rod 163 and dogs 168, associated there with, downwardly, thus releasing the container. This movement of the arm 142 has no effect upon the receiver gates operating mechanism: it rocks the double arm 153 in a clockwise direction (looking at Figures 9 or 13) and therefore away from the pins 154.

The scale stabilizing mechanism consists of a lever 180 fulcrumed at 181 and carrying on one end a roller 182 normally resting on the cam 139. The other end of the lever 180 is connected to a stabilizer bar 183 the lower end of which is bent at a right angle as at 184 and is so positioned as to engage the frame 44 when being lifted. A spring 185 lifts the bar 183 whenever the roller 182 leaves the cam 139 thereby arresting the scale 47.

*Operation of the mechanism*

The shaker 6 delivers material at a substantially uniform rate into the main feed 4 and the trickle feed 3. The amount of material to be delivered by the latter may be regulated by changing the width of the small chute 8 by means of the lever 14. Material drops through said feeds into the weighing receiver 40 until the weight of material combined with that of the auxiliary weight 106 resting on the scale frame 44 reaches the full weight of the pack. Then the scale beam 55 is raised and the contact points 56 and 57 are closed. The solenoid 66 becomes energized and actuates the main lever 72, thereby closing the main feed gate 21, raising the auxiliary weight 106 off the frame 44 and rearranging the relation of certain parts of the mechanism in readiness to complete the weighing operation.

The raising of the auxiliary weight 106 tilts the scale beam 55 downwardly, thus disengaging the contact points 56 and 57. The trickle feed 3, being opened, continues to deliver material into the weighing receiver 40 and the scale beam 55 gradually rises up for second time. When the weight of material in the receiver exactly reaches the desired amount, the contact points close again and instantly the solenoid 66 actuates the main lever 72. The upward movement of the latter sets the clutch in motion and simultaneously releases the trigger 38, thereby instantly closing the trickle feed 3.

The clutch member 80 now starts to rotate in a clockwise direction, and by means of the stud 79 swings the arm 142 and thereby opens the receiver gates 42 and 43. By cooperative action of the roller 147 and the cam 138 the gates are kept open for a comparatively short time, but still sufficient to completely dispose of the material stored in the receiver. Material thus discharged drops into the container which is positioned beneath the receiver 40.

Further rotation of the clutch brings the cam 139 and the roller 148 into engagement, thereby swinging the arm 142 in counter clockwise direction. This movement of said arm operates the container arresting mechanism by forcing the push rod 163 and the dogs 168, associated therewith, downwardly. The belt 49 carries the filled container away and moves the next one into place. The length of the cam 139 is so calculated as to release the dogs 168 just behind the container, thereby immediately arresting the one following.

Rotation of the clutch member 80 brings the stud 79 and the cam lever 76 into engagement, lifts the latter into its starting position, as shown in Figure 5, and thereby simultaneously opens both feed gates 20 and 21. The feed gates are opened after closing of the receiver gates 42 and 43.

At the beginning of the weighing operation the roller 182 of the stabilizer lever 180 rests on the cam 139. Rotation of the clutch member 80 disengages said roller and cam and the spring 185 lifts the stabilizer bar 183. The latter engages the receiver frame 44 and remains engaged while the clutch rotates. A considerable amount of material accumulates in the main feed 4 while the latter is closed and when this mass is suddenly discharged into the weighing receiver 40, the impact of the falling material may be sufficient to bounce the scale beam 55 and prematurely close the contact points 56 and 57. The stabilizing mechanism eliminates the bouncing of the scale beam 55 as the spring 185 absorbs the shock. At the end of the complete revolution the stabilizer bar 183 is again disengaged from the frame 44.

The provision of the auxiliary weight 106 in conjunction with the weight stabilizing mechanism enables the main bulk of material, equal in weight to the weight of the pack minus that of the auxiliary weight, to be speedily placed upon the scale without bouncing or otherwise disturbing it so as to effect the exactness of the weighing operation. The balance of material which must be delivered to make up the full weight is represented by a material which has been falling from the main feed at the moment the latter was closed and material which is allowed to trickle into the receiver. Strictly speaking, the closing of the trickle feed is done slightly before the predetermined weight of material in the receiver is reached, so as to allow material falling from the trickle feed to make up the exact weight. The trickle feed is made adjustable so as to enable the operator to compensate the differences in material and variations in the speed of delivery of said material. Because the contact points 57 and 56, and the trigger 38 are adjustable, the time of closing the main and trickle feed may be selected with considerable exactitude, thus assuring the accuracy of the weighing operation.

In actual practice, about 95% of the full weight of material is delivered by the main feed and about 5% by the trickle feed. Consequently, the weighing machine works efficiently at high speeds and we have found that when handling prunes in 25 pound lots it may be successfully operated at any speed up to seven tons per hour.

If abnormal amounts of material should somehow accumulate in the main feed and then be dropped into the receiver 40, the scale beam will swing upwardly and stay in that position. The solenoid 66 will raise the main lever 72 and keep the latter in upward position as long as the former remains energized. Therefore the cam lever 76 being dropped down will swing the stub-shaft 83 downwardly and actuate the link 89 and the arm 90. The clutch mechanism will be immediately set in motion and the material will be discharged.

Although we have shown and described only one form of our invention, it should be understood that various changes or modifications may be made within the scope of the annexed claims without departing from the spirit of the invention.

What we claim and desire to secure by grant of Letters Patent is:

1. The combination of a scale having a platform, a main feed, a trickle feed, a weighing receiver resting on said platform, means for establishing an electrical circuit when a certain amount of material is discharged into the receiver, means controlled by said circuit for closing the main feed and breaking of said circuit, means for reestablishing said circuit when the weight of said material reaches the exact amount desired, and means controlled by said circuit for closing the trickle feed.

2. A weighing machine comprising a scale having a stationary frame, a platform and a beam; a main feed; a trickle feed; a weighing receiver supported by said platform; an electric contact point affixed to the beam; a complementary contact point arranged on said stationary frame; means for closing said contact points and establishing a circuit when a certain amount of material is discharged into the receiver thereby closing the main feed; means for breaking the circuit established by said points; and means for remaking the circuit to close the trickle feed when the amount of material in the receiver reaches the exact weight desired.

3. A weighing machine comprising a scale having a platform; a main feed; a trickle feed; a weighing receiver supported by said platform; an auxiliary weight, means for depositing said auxiliary weight on the weighing receiver frame; means for closing the main feed and raising the auxiliary weight when the amount of material in the receiver reaches a certain weight; and means for closing the trickle feed when the amount of said material reaches the exact weight desired.

4. The combination of a scale having a stationary frame, a platform and a beam with a main feed and a trickle feed associated therewith; a weighing receiver supported by the platform to catch material discharged by said feeds; a pair of contact points arranged on the beam and the stationary frame in operative relation; an auxiliary weight adapted to rest on the weighing receiver frame until the weight of material in the receiver reaches a certain amount, thereby tilting the beam and closing the contact points; means for the simultaneous closing of said main feed and the lifting of the auxiliary weight from the weighing receiver frame, thereby disengaging the contact points, means operated by the second closing of said contact points for closing the trickle feed when the weight of material in the receiver reaches the amount desired and means for discharging material from said receiver.

5. In a weighing machine, a scale, a weighing receiver attached thereto, said scale having a beam and a stationary frame; a slide affixed to the frame; a bracket slidably carried thereby; a contact point pivotally attached to the bracket, a complementary contact point carried by the beam, a circuit adapted to be closed thereby, and means within the circuit actuated upon the closing thereof for discharging material from said weighing receiver.

6. In a weighing machine, a scale, a weighing receiver carried thereby, means for delivering material into the receiver, a stabilizer bar adapted to engage the receiver for absorbing the force of the impact of material discharged by the delivering means, and means for effecting the engagement between the stabilizer bar and receiver.

7. In a weighing machine, a scale, a weighing receiver carried thereby, means for delivering material into the receiver, a stabilizer bar adapted to engage the receiver for absorbing the force of the impact of the initial discharge of material by said delivering means, a cam for effecting the engagement between said receiver and bar and means for actuating said cam.

8. In a weighing machine, a scale having a stationary frame and a beam; a weighing receiver supported by the scale; a main feed and a trickle feed for delivering material into the receiver; an auxiliary weight resting on said scale; a pair of contact points arranged on said frame and beam and adapted to make a circuit, a solenoid in the circuit established by the closing of said contact points, a main lever operatively connected to the solenoid; a set of levers connected to the main lever and adapted to close the main feed and raise the auxiliay weight from the scale when the circuit is closed the first time, and to successively close the trickle feed, discharge material from the receiver and open both feeds when the circuit is closed the second time.

9. In a weighing machine, a scale, a weighing receiver attached thereto, main and trickle feeds adapted to discharge material into said weighing receiver, said scale having a beam and a stationary frame, a slide affixed to the frame; a bracket slidably carried thereby; a contact point pivotally attached to the bracket, a complementary contact point carried by the beam, a circuit adapted to be closed thereby, and means within the circuit for successively closing the main feed, the trickle feed and discharging material from said weighing receiver.

10. In a weighing machine, a scale, a weighing receiver attached thereto, main and trickle feeds adapted to discharge material into said weighing receiver, an endless conveyor running under said receiver. Means for arresting movement of receptacles carried by said conveyor under said receiver, said scale having a beam and a stationary frame, a slide affixed to the frame; a bracket slidably carried thereby; a contact point pivotally attached to the bracket, a complementary contact point carried by the beam, a circuit adapted to be closed thereby, and means within the circuit actuated upon the closing thereof for successively closing the main feed and the trickle feed, discharging material from said weighing receiver, and releasing the filled receptacle held by said arresting means.

FRANK A. RANDALL.
JOHN D. CANTONI.